(12) United States Patent
Uhlmann et al.

(10) Patent No.: US 8,788,111 B2
(45) Date of Patent: Jul. 22, 2014

(54) IDENTIFYING A FAN CONNECTED TO A COMPUTING DEVICE

(75) Inventors: Stephen G Uhlmann, Loveland, CO (US); Robert Lee Crane, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 13/222,250

(22) Filed: Aug. 31, 2011

(65) Prior Publication Data

US 2013/0054047 A1 Feb. 28, 2013

(51) Int. Cl.
*G05D 23/00* (2006.01)
*G05D 13/00* (2006.01)
*H05K 7/20* (2006.01)
*G01B 3/00* (2006.01)
*G01B 5/00* (2006.01)
*G01D 3/00* (2006.01)

(52) U.S. Cl.
USPC ............. 700/299; 700/300; 700/304; 702/33; 702/108; 702/113; 361/695

(58) Field of Classification Search
USPC ............. 700/299, 300, 304; 361/695; 702/33, 702/108, 113
See application file for complete search history.

(56) References Cited

U.S. PATENT DOCUMENTS

| 6,873,883 | B2 | 3/2005 | Ziarnik |
| 6,948,020 | B1 | 9/2005 | Bonomo et al. |
| 7,233,120 | B2 | 6/2007 | Romero Pintado et al. |
| 7,313,466 | B2 * | 12/2007 | Chang ........................... 700/300 |
| 7,319,299 | B2 | 1/2008 | Freeman et al. |
| 7,387,499 | B2 | 6/2008 | Flanigan |
| 7,425,812 | B2 | 9/2008 | Goldberg |
| 7,605,556 | B2 | 10/2009 | Frankel et al. |
| 7,844,750 | B2 * | 11/2010 | Pearce et al. .................... 710/15 |
| 7,863,839 | B2 | 1/2011 | Schuricht et al. |
| 2003/0218465 | A1 | 11/2003 | Rijken et al. |
| 2007/0019383 | A1 | 1/2007 | Chang |
| 2008/0198546 | A1 | 8/2008 | Pearce et al. |
| 2009/0015241 | A1 | 1/2009 | Gross et al. |
| 2009/0169188 | A1 * | 7/2009 | Huang et al. .................. 388/811 |
| 2009/0206842 | A1 | 8/2009 | Vaidyanathan et al. |
| 2009/0234995 | A1 | 9/2009 | Langgood et al. |
| 2010/0097019 | A1 | 4/2010 | Artman et al. |
| 2012/0084551 | A1 | 4/2012 | Cheng et al. |

FOREIGN PATENT DOCUMENTS

JP 2009-171714 A 7/2009

OTHER PUBLICATIONS

"4-Wire Pulse Width Modulation (PWM) Controlled Fans," Specification, Revision 1.2, Intel Corporation, Jul. 2004, pp. 1-23, Available at: <formfactors.org/developer%5Cspecs%5CREV1_2_Public.pdf>.

Maxim Integrated Products, "Fan Controller and Remote Temperature Sensor with SMBus Serial Interface," Jan. 2000, <http://datasheets.maximintegrated.com/en/ds/MAX1669.pdf>.

* cited by examiner

*Primary Examiner* — Ronald Hartman, Jr.
(74) *Attorney, Agent, or Firm* — Mark J. Kupets

(57) ABSTRACT

Example embodiments disclosed herein relate to identifying a target fan connected to a computing device. In example embodiments, the target fan may be identified based on a fan speed profile of the target fan.

16 Claims, 9 Drawing Sheets

IDENTIFYING A FAN CONNECTED TO A COMPUTING DEVICE

BACKGROUND

A computing device may be connected to and operate a plurality of hardware components. However, within a particular class of hardware components (e.g., processors, memory devices, etc.), different components within the class may benefit from different operation of the computing device. Additionally, a hardware component different than an intended hardware component may be erroneously connected to the computing device, which may prevent the computing device from operating optimally or even damage the computing device or a component thereof.

BRIEF DESCRIPTION OF THE DRAWINGS

The following detailed description references the drawings, wherein.

DETAILED DESCRIPTION

Figure 1:
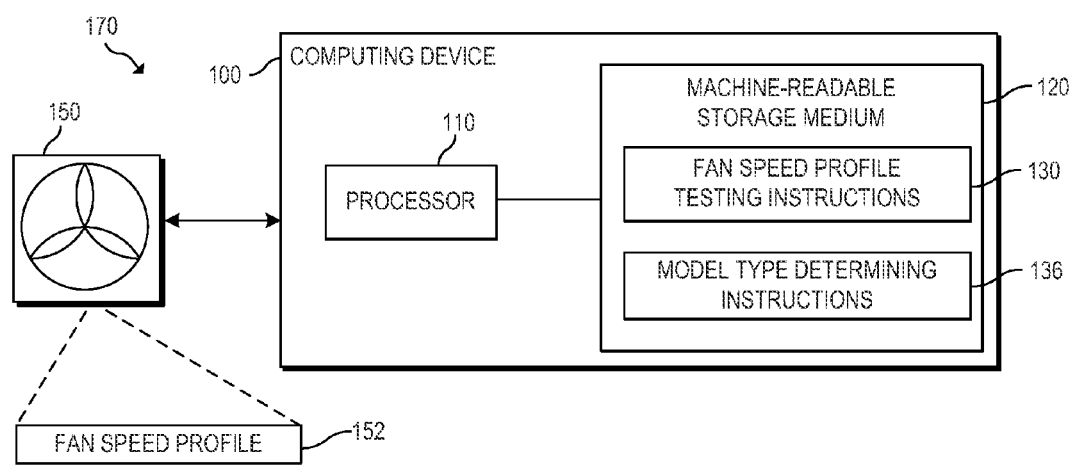
FIG. 1 is a block diagram of at least a portion of an example computing system for determining a model type of a target fan connected to a computing device.

Ensuring that intended hardware components are connected to a computing device may be useful. For example, a first hardware component (e.g., a first processor) may generate significantly more heat than a second hardware component of the same class (e.g., a second processor). As such, the first hardware component may benefit from being cooled by a more efficient fan of a first model type, while a less efficient, less expensive fan of a second model type may be sufficient for cooling the second hardware component. However, if the less efficient fan is erroneously connected to the computing device to cool the first hardware component, then the first hardware component may overheat and/or be damaged in operation if the less efficient fan does not have sufficient cooling capacity. Alternatively, if the less efficient fan has sufficient cooling capacity, it may be useful to reconfigure the computing device to cool the first hardware component with the connected, less efficient fan.

Accordingly, it may be beneficial to enable a computing device to determine a model type of a target fan connected to the computing device so that the computing device may, for example, confirm the connection of an appropriate fan, alert a user to the connection of an inappropriate fan, or reconfigure the computing device to operate the connected target fan. However, adding to a fan, for example, an integrated circuit (IC), memory device, or other component capable of storing information identifying a model type of the fan may excessively increase fan manufacturing costs. Alternatively, adding to a fan's connector an additional pin for fan identification, for example, may lead to the addition of a corresponding pin in a fan connector of a computing device. In such cases, the additional pin may increase manufacturing costs of the fan, increase the motherboard footprint of a computing device's fan connector, occupy an additional line of the motherboard, and/or lead to the addition of another line to the motherboard. Moreover, in such cases, upgrading a computing device with the more efficient fan may compel a user to also replace the computing device's motherboard with a motherboard having a fan connector with an additional pin.

To address these issues, examples disclosed herein enable a computing device to determine a model type of a target fan connected to the computing device by testing a fan speed profile of the target fan. In particular, in some examples, fans of different model types may be configured with different fan speed profiles, respectively, such that fans of different model types may be distinguished on the basis of their fan speed profiles. In such examples, a computing device may drive the target fan with a fan driving signal and determine the model type of the fan based at least in part on a detected speed of the fan while the fan is driven with the driving signal. Additionally, in some examples, a computing device may drive the target fan with a plurality of fan driving signal values (e.g., at different times) and determine the model type of the fan based at least in part on a plurality of fan speeds each detected while the fan is driven with one of the plurality of driving signal values, respectively.

In this manner, examples disclosed herein may enable a computing device to determine the model type of a connected target fan without an additional pin in the fan's connector. As such, examples disclosed herein may enable a computing device to determine a model type of a fan without, for example, increasing the amount of motherboard space dedicated to the fan. Additionally, examples disclosed herein may allow a computing device to be upgraded with a new fan without compelling a concurrent motherboard replacement. That is, examples disclosed herein may be backwards compatible with previously produced computing devices and may enable such computing devices to be upgraded to determine fan model types as described in relation to examples disclosed herein. Moreover, examples disclosed herein may enable a computing device to determine the model type of a connected target fan without the potentially excessive cost of adding to a fan an IC, memory device, or other component capable of storing information identifying a model type of the fan.

Referring now to the drawings, FIG. 1 is a block diagram of at least a portion of an example computing system 170 including a target fan 150 connected to a computing device 100 for determining a model type of target fan 150. Target fan 150 may be any fan operable by computing device 100. In some examples, target fan 150 is a computer fan configured (e.g., with an appropriate size, appropriate efficiency, etc.) for operation as a part of and/or within a case of a computing system such as, for example, a desktop computer, a notebook computer, a workstation, or any other computer system configured to utilize a fan to cool components of the computing system. In other examples, target fan 150 may be a fan configured to be operated as a part of and/or within a peripheral device, such as a printer, or any other device configured to utilize a fan to cool components of the device.

Figure 2:
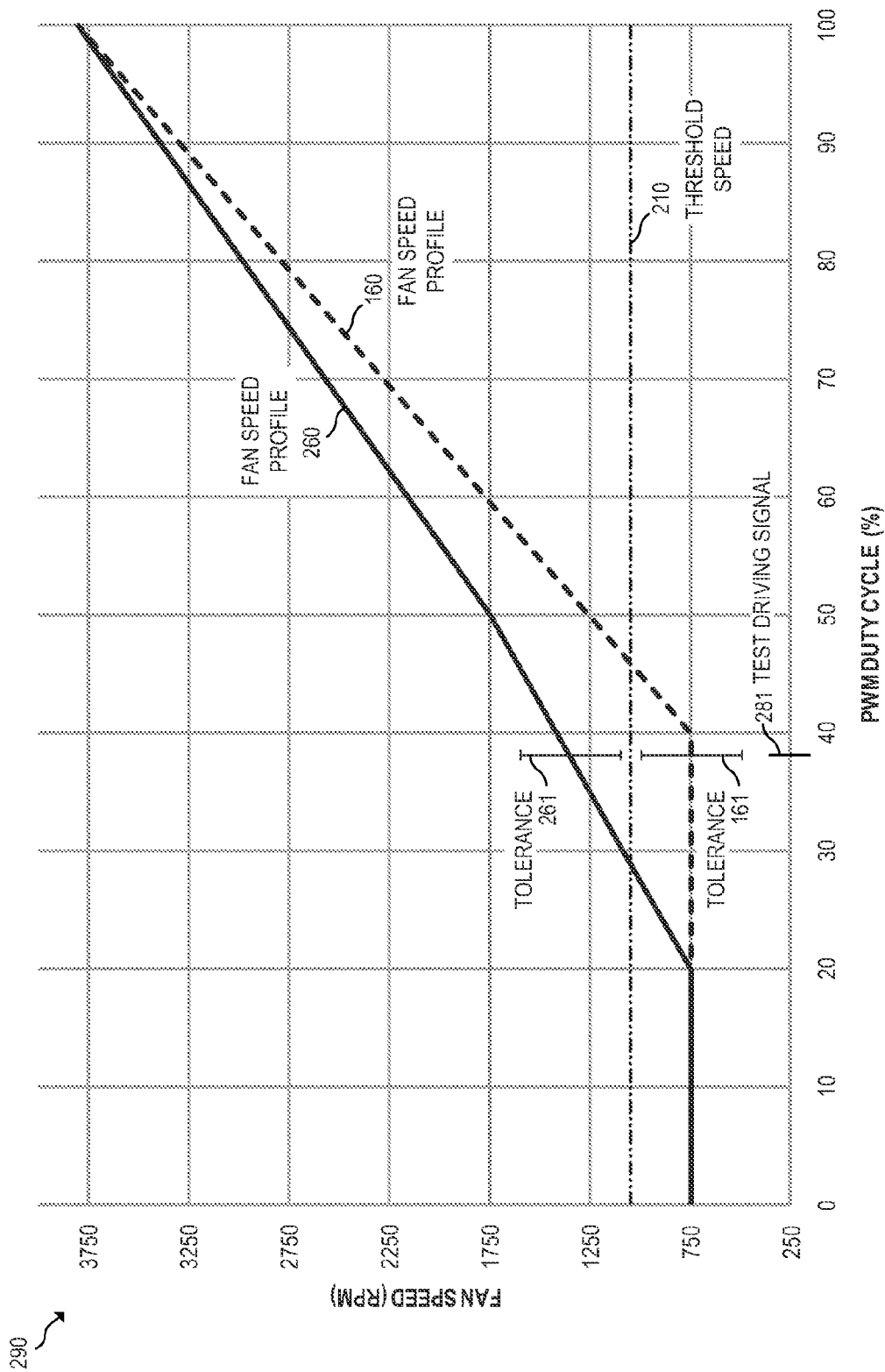
FIG. 2 is a graph of two example fan speed profiles and an example threshold speed that may be used to distinguish between the profiles, according to one example herein.

In the example of FIG. 1, target fan 150 has a fan speed profile 152. As used herein, a "fan speed profile" of a fan defines a relationship between a plurality of fan driving signal values and respective fan speeds for the fan. For example, a fan speed profile of a fan may define, for a plurality or range of fan driving signal values, an approximate speed (e.g., within a certain tolerance) at which the fan may operate (e.g., spin) when driven with a fan driving signal of a particular value. Example of fan speed profiles are shown in FIG. 2, which will be described in more detail below.

In the example of FIG. 1, computing device 100 includes a processor 110 and a machine-readable storage medium 120 including instructions 130 and 136 for determining a model type of target fan 150. As used herein, a "computing device" is a chip set of a computing system, or any other component or collection of components of a computer system suitable for operating a fan. In some examples, computing device 100 may comprise processor 110, machine-readable storage medium 120, and a fan controller disposed on a computer motherboard having a fan connector configured to receive a connector of target fan 150. Additionally, in some examples, instructions 130 and 136 may be part of the basic input/output system (BIOS) of computing device 100 and executed prior to execution of an operating system. Alternatively, instructions 130 and 136 may be executed as a portion of a diagnostic application that may be executed during execution of an operating system of computing device 100.

As used herein, a "processor" may be at least one central processing unit (CPU), at least one semiconductor-based microprocessor, at least one graphics card, at least one graphics processing unit (GPU), at least one other hardware device suitable for the retrieval and execution of instructions stored on a machine-readable storage medium, or a combination thereof. Additionally, any processor described herein may include a single core on a chip, multiple cores on a chip, multiple cores across multiple chips, multiple cores across multiple devices, or a combination thereof. In the example of FIG. 1, processor 110 may fetch, decode, and execute instructions 130 and 136 of machine-readable storage medium 120 to implement the functionality described below. As an alternative or in addition to fetching, decoding, and executing instructions, processor 110 may include at least one IC, at least one other electronic circuit, other control logic, or a combination thereof for performing some or all of the functionality of instructions 130 and 136 described below.

As used herein, a "machine-readable storage medium" may be any electronic, magnetic, optical, or other physical storage device that contains or stores executable instructions. For example, any machine-readable storage medium described herein may be any of Random Access Memory (RAM), flash memory, a storage drive (e.g. a hard disk), a Compact Disc Read Only Memory (CD-ROM), and the like, or a combination thereof. Further, any machine-readable storage medium described herein may be non-transitory.

As described below, machine-readable storage medium 120 may include instructions for determining a model type of target fan 150. As used herein, a fan of a given "model type" is a fan having a particular design such that fans of the same model type have the same design, and fans of different model types have different designs. The "design" of a fan, as used herein, means the set of physical and operational characteristics of a fan when the fan is fully operational (i.e., not broken or otherwise malfunctioning). The design of a fan may include certain tolerances within which a fan is considered to be fully operational. As used herein, the "physical characteristics" of a fan may include physical components included in the fan, any aspect of the shape, size, or layout of the fan, the structure of components of the fan (e.g., fan blade shape, blade number, etc.), and the like. The "operational characteristics" of a fan, as used herein, may include characteristics of the fan's operation such as, for example, the fan's power consumption, efficiency, and the like.

Additionally, as used herein, fans of (or "having") the same model type share all physical and operational characteristics when operational in accordance with their designs (i.e., when not broken or otherwise malfunctioning). Additionally, as used herein, fans of (or "having") different model types differ in at least one physical and/or operational characteristic when each of the fans is operational in accordance with its respective design (i.e., when not broken or otherwise malfunctioning). As such, two fans sharing the same design when fully operational are not considered to have different model types when at least one of the fans is malfunctioning.

In some examples, fans may be designed such that fans of different model types have different fan speed profiles, while fans of the same model type have the same (or approximately the same) fan speed profile. In such examples, the model type of a target fan may be identified based on a fan speed profile of the target fan. Similarly, fan speed profiles may be used, for example, to distinguish fans of different model types. In some examples, a select group of fan model types may be designed with different fan speed profiles such that the model type of a target fan of the group may be identified based on the fan's fan speed profile and/or such that fan speed profiles may be used to distinguish fans of different model types within the group.

Machine-readable storage medium 120 includes instructions 130 and 136 for determining the model type of target fan 150 based on fan speed profile 152 of target fan 150. In the example of FIG. 1, fan speed profile testing instructions 130 may test fan speed profile 152 of target fan 150 connected to computing device 100, and instructions 136 may determine the model type of target fan 150 based on a result of the test. For example, instructions 130 may drive target fan 150 with a test driving signal and detect a speed of target fan 150 while target fan 150 is driven with the test driving signal. In such examples, instructions 136 may determine the model type of target fan 150 based on the detected speed.

In some examples, fans of a first model type may be designed to have a fan speed profile that, within a selected range of driving signal values, is divergent from the fan speed profile of fans of a second model type by a wide enough margin to distinguish the fans of the first and second model types based on at least one detected speed when driven within a driving signal with the selected range. In such examples, a threshold speed may be set based on the divergence of the fan speed profiles at the selected driving signal value. For example, the threshold speed may be between the respective speeds of the fan speed profiles at the selected driving signal value. In such examples, instructions 130 may drive target fan 150 with a test driving signal at the selected driving signal value and detect the speed of target fan 150 while driven with the test driving signal of the selected value. Instructions 136 may then determine the model type of target fan 150 by comparing the detected speed to the threshold speed since the fan speed profiles are divergent as described above and correspond to the first and second model types, respectively. In some examples, fans of the first model type may be designed to have a fan speed profile that is divergent from a known fan speed profile of fans of a second model type. Alternatively, both fan speed profiles may be designed such that they are divergent from one another. Additionally, in some examples, instructions 130 and 136 of FIG. 1 may be the same as instructions 130 and 136 described below in relation to FIG. 3.

In other examples, fans of more than two different model types may be designed to have different fan speed profiles, respectively, such that fans of the more than two different model types may be distinguished by testing a fan speed profile. In such examples, instructions 136 may determine the model type of target fan 150 among the different model types by, for example, comparing the detected speed to more than one speed threshold. Alternatively, instructions 130 may detect the speed of target fan 150 at a plurality of driving signal values and instructions 136 may determine the model type of target fan 150 among the group of model types by, for example, comparing the detected speeds to a plurality of speed thresholds. In other examples, instructions 136 may determine the model type of target fan 150 among the group of model types by testing a slope of the fan speed profile of target fan 150. In some examples, certain fan speed profiles of the group of fan model types may be designed around at least one known fan speed profile of at least one fan model type. In other examples, each fan speed profile of the group may be designed such that fans of the group of more than two different model types may be distinguished on the basis of the fan speed profiles.

By determining the model type of target fan 150, computing device 100 may determine whether target fan 150 is of an appropriate model type for operation with at least one component of computing device 100. For example, a hardware component of computing device 100 (e.g., processor 110) may overheat and potentially be damaged if cooled by a fan having inadequate efficiency for cooling the hardware component. In examples described herein, computing device 100 may determine whether a target fan 150 connected to computing device 100 is a fan of a model type known to have inadequate efficiency. If so, in some examples, computing device 100 may alert a user of computing device 100 that an inappropriate fan has been connected so that the user may replace target fan 150 with a more appropriate fan to potentially prevent the hardware component from being damaged by operation with an inappropriate fan. In other examples, computing device 100 may, in response to the determination, reconfigure computing device 100 to operate target fan 150 in a manner that may prevent damage to the hardware component.

FIG. 2 is a graph of two example fan speed profiles 160 and 260 and an example threshold speed 210 that may be used to distinguish between fan speed profiles 160 and 260 according to one example herein. In the example of FIG. 2, graph 290 illustrates example fan speed profiles 160 and 260 of fans of different model types, respectively. In such examples, fans of a first model type may be designed to have a fan speed profile that is divergent from the fan speed profile of fans of a second model type such that fans of the different model types may be distinguished based on their fan speed profiles.

In the example of FIG. 2, graph 290 illustrates a fan speed profile 160 of fans of a first model type and a fan speed profile 260 of fans of a second model type different than the first model type. In graph 290, fan speed profiles 160 and 260 are each illustrated as a plurality of fan speeds in revolutions per minute (RPM) at each of a plurality of driving signal values. In some examples, fan driving signals (which may be referred to herein as "driving signals") may be pulse-width modulation (PWM) signals. In such examples, the PWM duty cycle may be the driving signal value, and varying the PWM duty cycle varies the driving signal value. In other examples, the driving signals may be voltages, and the driving signal values may be voltage values. Alternatively, driving signals may be any other type of signal suitable for driving a fan with varying driving signal values. In the example of FIG. 2, the driving signals may be PWM signals, and the driving signal values are PWM duty cycles expressed as percentages. Graph 290 also illustrates an example threshold speed 210 and a test driving signal 281.

In the example of FIG. 2, fans of the first model type may be designed to have a fan speed profile 160 that, within a first range of driving signal values, is divergent from fan speed profile 260 by a margin wide enough that fans of the first and second model types may be distinguished based on a detected speed when driven with a driving signal in the first range. For example, in accordance with fan speed profile 260, a fan of the second model type may operate at approximately 750 RPM when driven with a driving signal having a PWM duty cycle in the range of about 0-20%, and above 20% the fan speed may increase as the PWM duty cycle increases. However, in accordance with fan speed profile 160, a fan of the first model type may operate at approximately 750 RPM when driven with a driving signal having a PWM duty cycle in the range of about 0-40%, and above 40% the fan speed may increase as the PWM duty cycle increases. Accordingly, as shown in graph 290, fan speed profiles 160 and 260 may have a greatest fan speed divergence at driving signal values of around a 40% PWM duty cycle.

As such, in some examples, a computing device may detect a speed of a connected target fan while the fan is driven with a test driving signal 281 having a PWM duty cycle of approximately 38% to determine whether the target fan is of a first model type having fan speed profile 160 or a second model type having fan speed profile 260. In such examples, a threshold speed 210 may be defined between the respective speeds of profiles 160 and 260 at a PWM duty cycle of 38%. A computing device may, for example, compare the detected speed to threshold 210 to determine whether the target fan is of a first or a second model type. In other examples, the test driving signal may have a different PWM duty cycle, such as another PWM duty cycle near 40%. Although test driving signals of around 40% is used in the example of FIG. 2, in other examples, fan speed profiles may be designed such that the profiles may be distinguished using a test driving signal of a different value. For example, profiles 160 and 260 may be designed such that the profiles may be distinguished from one another based on the respective minimum or maximum speeds of the profiles. In such examples, a model type of a target fan may be determined by testing the target fan with a driving signal having a minimum value (e.g., about 0% PWM duty cycle). In other examples, a model type of a target fan may be determined by testing the target fan with a driving signal having a maximum value (e.g., about 100% PWM duty cycle).

In some examples, a fan driven with a driving signal of a particular value may not operate at a precise speed defined by the fan speed profile of the fan for that particular value. Rather, the fan may achieve a speed that is within a certain tolerance range of the speed defined by the fan speed profile. In the example of FIG. 2, for example, when driven with a test driving signal 281 having a PWM duty cycle of approximately 38%, a fan of a first model type having fan speed profile 160 may operate at a speed within a tolerance 161 of +/−250 RPM relative to the 750 RPM speed indicated by fan speed profile 160 for the fan of the first model type when driven with test driving signal 281. Similarly, a fan of a second model type having fan speed profile 260 may operate at a speed within a tolerance 261 of +/−250 RPM relative to the speed of approximately 1350 RPM indicated by fan speed profile 260 for the fan of the second model type when driven with test driving signal 281.

Accordingly, in some examples, threshold speed 210 may be set between tolerances 161 and 261 such that a computing device comparing a detected fan speed to threshold speed 210 may more reliably distinguish between fans of different model types. For example, threshold 210 may be set at a speed of 1050 RPM. In other examples, profile 260 may have a speed of about 1400 RPM at a PWM duty cycle of about 38%. In such examples, threshold 210 may be set at a speed of about 1100 RPM. In some examples, different fan speed profiles may be considered to be divergent by a margin "wide enough" (or "sufficiently divergent") to distinguish the profiles (and thus fan model types) at driving signal values at which the tolerances of the respective profiles do not overlap so that a threshold speed may be set at a speed between the respective tolerances. The above described fan tolerances of +/−250 RPM fan tolerances are example tolerances. In other examples, fans may have different tolerances, fans may have tolerances that vary with driving signal value, and/or fans of different model types may have different tolerances.

In some examples, computing device 100 of FIG. 1 may determine whether target fan 150 is a fan of a first model type having a fan speed profile 160 or a fan of a second model type having a fan speed profile 260 in accordance with the example of FIG. 2. In such examples, instructions 130 may drive target fan 150 with test driving signal 281 having a PWM duty cycle of about 38% and detect the speed of target fan 150 while driven with test driving signal 281. If target fan 150 is a fan of a first model type, the detected speed may be within tolerance 161 and thus below threshold speed 210. If target fan 150 is a fan of a second model type, the detected speed may be within tolerance 261 and thus above threshold speed 210. Accordingly, instructions 136 may determine that target fan 150 is a fan of the first model type if the detected speed is below threshold speed 210 and may determine that target fan 150 is a fan of the second model type if the detected speed is above threshold speed 210. Although an implementation of the example of FIG. 2 is described above in the context of computing system 170 of FIG. 1, the example of FIG. 2 could also be practiced in other contexts (e.g., the context of computing system 370 or 670).

Figure 3:
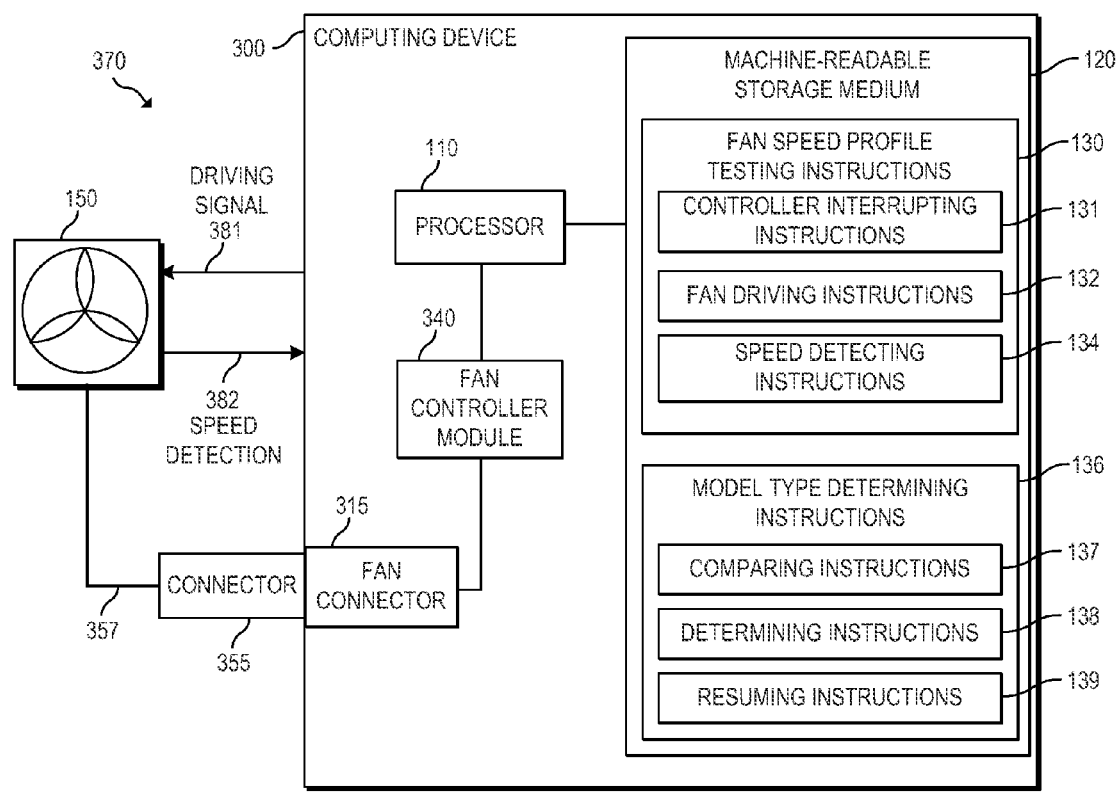
FIG. 3 is a block diagram of at least a portion of an example computing system for determining a model type of a target fan connected to a computing device including a fan controller module.

FIG. 3 is a block diagram of at least a portion of an example computing system 370 for determining a model type of a target fan 150 connected to a computing device 300 including a fan controller module 340. Computing system 370 includes a computing device 300 and a target fan 150 having a fan speed profile. In the example of FIG. 3, target fan 150 is connected to computing device 300 by a connection 357 (e.g., a cable, etc.) having a multi-pin connector 355. In some examples, connector 355 may be a 4-pin connector. Computing device 300 includes a processor 110, a machine-readable storage medium 120 including instructions 130 and 136 for determining a model type of target fan 150, a fan controller module 340, and a fan connector 315. Computing device 300 may, for example, comprise processor 110, machine-readable storage medium 120, fan controller 340 and fan connector 315 on a computer motherboard.

In some examples, fan connector 315 may be a 4-pin connector configured to receive a 4-pin connector 355 of fan 150. In some examples, all communications between target fan 150 and computing device 300 may be provided through connection 357 and connectors 355 and 315. Additionally, in some examples, the instructions of machine-readable storage medium 120 may be part of the BIOS of computing device 300 and executed prior to execution of an operating system. Alternatively, the instructions of machine-readable storage medium 120 may be executed as a portion of a diagnostic application that may be executed during execution of an operating system of computing device 300.

In the example of FIG. 3, instructions 130 may include instructions 131, 132, and 134, and instructions 136 may include instructions 137, 138, and 139. In some examples, processor 110 may fetch, decode, and execute instructions 130, 131, 132, 134, 136, 137, 138, and 139 of machine-readable storage medium 120 to implement the functionality described below. As an alternative or in addition to fetching, decoding, and executing instructions, processor 110 may include at least one IC, at least one other electronic circuit, other control logic, or a combination thereof for performing some or all of the functionality of instructions 130, 131, 132, 134, 136, 137, 138, and 139 described below.

In the example of FIG. 3, fan controller module 340 may comprise logic for implementing the functionality described below. For example, computing device 300 may comprise at least one hardware device including electronic circuitry for implementing the functionality of module 340. Alternatively, the functionality of module 340 may be implemented as a series of instructions encoded on a machine-readable storage medium of computing device 300 and executable by processor 110 of computing device 300. In other examples, some functionality of module 340 may be implemented as electronic circuitry while the other functionality is implemented as executable instructions.

Fan controller module 340 may, for example, drive target fan 150 with driving signals 381 and detect a speed of target fan 150 based on speed detection signals 382 received from target fan 150. In some examples, communications 381 and 382 may be provided between target fan 150 and computing device 300 through connection 357 and connectors 355 and 315. In some examples, during operation of computing device 300, fan controller module 340 may control target fan 150 to cool at least one component of computing device 300 independent of processor 110. During operation of computing device 300, fan controller module 340 may continually detect a temperature of computing device 300 (e.g., an ambient temperature, a temperature of a hardware component of computing device 300, etc.) via at least one temperature sensor of computing device 300. In response to the temperatures detected, fan controller module 340 may drive target fan 150 with driving signals 381 to appropriately cool at least one component of computing device 300 (e.g., processor 110, a graphics card, etc.). Additionally, fan controller module 340 may detect, for example, a current speed of target fan 150 and adjust a value of driving signal 381 in response in order to achieve a desired fan speed. In some examples, fan controller module 340 of FIG. 3 may be the same as fan controller module 340 described below in relation to FIG. 6.

In some examples, target fan 150 may include a sensor (e.g., a Hall-effect sensor) that outputs a uniform number of pulses (e.g., two) for each revolution of target fan 150. Fan controller module 340 may receive these pulses via speed detection communications 382, for example, and determine the speed of the fan by determining, from the received pulses, the number of revolutions made by fan 150 over a certain amount of time. In other examples, fan controller module 340 may count the number of pulses, and processor 110 may determine the speed of target fan 150 from the count of pulses. In other examples, target fan 150 may include any other suitable component or components enabling fan controller module 340 and/or processor 110 to detect the speed of target fan 150.

Machine-readable storage medium 120 includes instructions 130 and 136 for determining the model type of target fan 150 based on fan speed profile 160 of target fan 150. As described above, during operation of computing device 300, fan controller module 340 may control target fan 150. Accordingly, in the example of FIG. 3, fan speed profile testing instructions 130 include controller interrupting instructions 131 that may interrupt the operation of fan controller module 340 so that computing device 300 may test the fan speed profile of target fan 150. Instructions 130 may further include fan driving instructions 132 and speed detecting instructions 134.

After interrupting the operation of fan controller module 340, instructions 132 may drive target fan 150 with a test driving signal 381 of a particular value for testing the fan speed profile of target fan 150. In some examples, instructions 132, when executed by processor 110, may cause processor 110 to drive target fan 150 with a test driving signal by instructing fan controller module 340 to drive target fan 150 with the test driving signal. Instructions 134 may then detect a speed of target fan 150 while driven with test driving signal 381. In some examples (e.g., the example illustrated in FIG. 2), instructions 132 may drive target fan 150 with one test driving signal 381 and instructions 134 may detect one fan speed of target fan 150. In other examples, instructions 134 may successively detect a plurality of fan speeds of target fan 150 while target fan 150 is successively driven with each of a plurality of test driving signals 381 of different values by instructions 132. In some examples, instructions 134, when executed by processor 110, may cause processor 110 to detect a speed of target fan 150 and/or instruct fan controller module 340 to detect the speed of target fan 150 via any manner described above, except that the speed may not be inferred from driving signal 381 in the example of FIG. 3. As used herein, a "plurality" of signals may be, for example, two or more discrete signals differing in at least one characteristic (e.g., value) or one signal having different characteristics (e.g., values) at different times. For example, a PWM signal having a different duty cycle at different times may be considered a plurality of signals herein.

After instructions 130 test the fan speed profile, instructions 136 may determine the model type of target fan 150. In the example of FIG. 3, comparing instructions 137 may compare at least one speed detected by instructions 134 to at least one speed threshold. In other examples, instructions 137 may determine the model type of target fan 150 among a group of model types based on a slope of the fan speed profile of target fan 150 using multiple detected speeds. Instructions 138 may then determine a model type of target fan 150 from comparison results of instructions 137. After determining the model type of target fan 150, instructions 139 may instruct fan controller module 340 to resume controlling target fan 150 to cool at least one component of computing device 300.

By determining the model type of a target fan as described above in relation to the example of FIG. 3, a computing device may determine the model type of the target fan using at least one fan speed detected while the target fan is driven with at least one test driving signal, respectively. In this manner, the model type of the target fan may be determined without adding a pin to a connector of the fan. As such, in the example of FIG. 3, computing device 300 may determine the model type of target fan 150 without adding a pin to connector 355 or fan connector 315 for that purpose. For example, in the example of FIG. 3, connector 355 and fan connector 315 may each be 4-pin connectors, and the model type of target fan 150 may be determined as described above by using the 4-pin connectors to drive and determine the speed of target fan 150.

Figure 4:
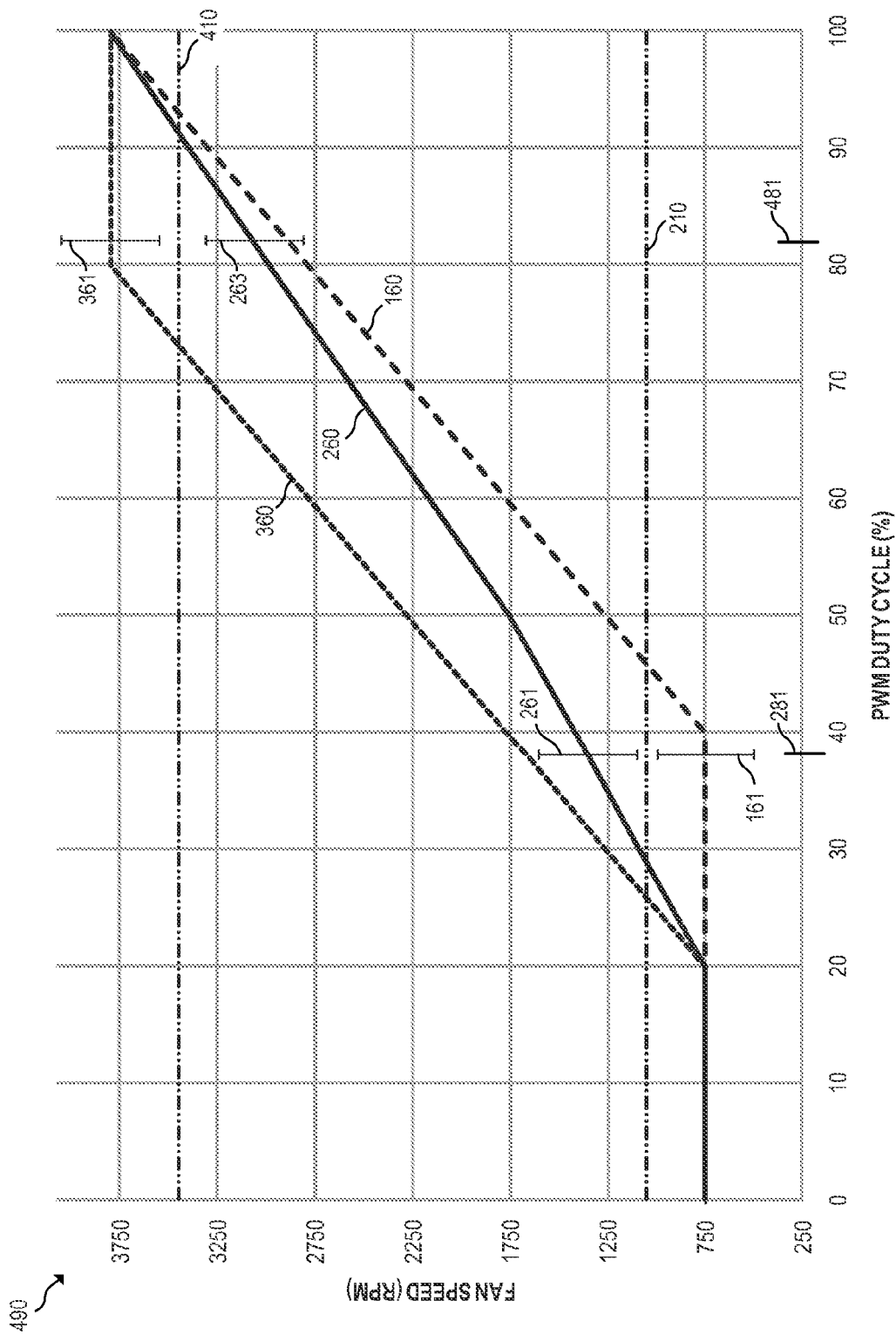
FIG. 4 is a graph of three example fan speed profiles and two example threshold speeds that may be used to distinguish between the profiles, according to one example herein.

FIG. 4 is a graph of three example fan speed profiles 160, 260, and 360, and two example threshold speeds 210 and 410 that may be used to distinguish among the profiles, according to one example herein. In the example of FIG. 4, graph 490 illustrates example fan speed profiles 160, 260, and 360 of fans of different model types, respectively. In such examples, fans of different model types may be designed to have respective fan speed profiles that are divergent from one another around at least one range of driving signal values such that fans of the different model types may be distinguished based on their fan speed profiles.

In graph 490, fan speed profiles 160, 260, and 360 are each illustrated as a plurality of fan speeds (RPM) at each of a plurality of driving signal values (PWM duty cycle). In the example of FIG. 4, fan speed profiles 160 and 260, tolerances 161 and 261, threshold speed 210, and test driving signal 281 are the same as described above in relation to graph 290 of FIG. 2. As such, fans of a first model type have a fan speed profile 160 and fans of a second model type different than the first model type have a fan speed profile 260. Additionally, in the example of FIG. 4, fan speed profile 360 is a fan speed profile of fans of a third model type different than each of the first and second model types. Graph 490 also illustrates an example threshold speed 410 and a test driving signal 481.

Moreover, as described above in relation to FIG. 2, fans may, for example, achieve a speed that is within a certain tolerance range of the speed defined by the fan speed profile. Tolerances 161, 261, 263, and 361 illustrated in graph 490 are example tolerances of +/−250 RPM at various PWM duty cycles. In the example of FIG. 4, tolerance 161 is a tolerance of fan speed profile 160 at a PWM duty cycle of about 38%. Additionally, tolerance 261 is a tolerance of fan speed profile 260 at a PWM duty cycle of about 38% and tolerance 263 is a tolerance of fan speed profile 260 at a PWM duty cycle of about 82%. Also, tolerance 361 is a tolerance of fan speed profile 360 at a PWM duty cycle of about 82%.

In the example of FIG. 4, fans of the first model type may be designed to have a fan speed profile 160 that, within a first range of driving signal values, is divergent from fan speed profiles 260 and 360 by a wide enough margin to distinguish the fans of the first model type from fans of the second and third model types based on at least one detected speed when driven within a driving signal in the first range. However, in the example of FIG. 4, fan speed profiles 260 and 360 may not be sufficiently divergent, within the first range of driving signal values, to distinguish fans of the second and third model types at a driving signal value within the first range. As such, in the example of FIG. 4, fans of the third model type may be designed to have a fan speed profile 360 that, within a second range of driving signal values, is divergent from fan speed profiles 160 and 260 by a margin wide enough to distinguish fans of the third model type from fans of the first and second model types based on a detected speed when driven with a driving signal in the second range. As such, in the example of FIG. 4, a computing device may determine whether a connected target fan is a fan of the first, second, or third model type based on a first speed of the target fan detected while the fan is driven with a test driving signal within the first range and a second speed of the target fan detected while the fan is driven with a test driving signal within the second range.

In some examples, computing device 300 of FIG. 3 may determine whether target fan 150 is a fan of a first model type having a fan speed profile 160, a second model type having a fan speed profile 260, or a third model type having a fan speed profile 360, in accordance with the example of FIG. 4. In such examples, after instructions 131 interrupt the operation of fan controller module 340, instructions 132 may cause fan controller module 340 to drive target fan 150 with test driving signal 281 within a first range of driving signal values at which fan speed profile 160 is sufficiently divergent from fan speed profiles 260 and 360. As illustrated in FIG. 4, for example, test driving signal 281 may have a PWM duty cycle of about 38%. In other examples, test driving signal 281 may have another value within the first range (e.g., another PWM duty cycle near 40%). Instructions 134 may then detect a first speed of target fan 150 while driven with test driving signal 281.

After detecting the first speed, instructions 132 may cause fan controller module 340 to drive target fan 150 with a test driving signal 481 that is different than a test driving signal 281 and is within a second range of driving signal values at which fan speed profile 360 is sufficiently divergent from fan speed profiles 160 and 260. As illustrated in FIG. 4, for example, test driving signal 481 may have a PWM duty cycle of about 82%. In other examples, test driving signal 481 may have another value within the first range (e.g., another PWM duty cycle near 80%). Instructions 134 may then detect the speed of target fan 150 while driven with test driving signal 481. Although test driving signals of around 40% and around 80% are used in the example of FIG. 4, in other examples, fan speed profiles may be designed such that the profiles may be distinguished using test driving signals of different values. For example, profiles 160, 260, and 360 may be designed such that the profiles may be distinguished from one another based on the respective minimum and maximum speeds of the profiles. In such examples, a target fan speed may be tested with a first driving signal having a minimum value (e.g., about 0% PWM duty cycle) and with a second driving signal having a maximum value (e.g., about 100% PWM duty cycle).

In some examples, instructions 137 may compare the first detected speed to threshold speed 210 and compare the second detected speed to a threshold speed 410 and instructions 138 may determine the model type of target fan 150 based on the results of the comparisons. In such examples, threshold speed 210 may be set between tolerances 161 and 261, such that a first detected speed (i.e., a speed detected while target fan 150 is driven with test driving signal 281) that is below threshold speed 210 may be reliably correlated with fan speed profile 160 and thus with a fan of a first model type.

Additionally, a first detected speed above threshold speed 210 may correspond to either profile 260 or 360. Because the tolerances of profiles 260 and 360 may overlap significantly at the value of test driving signal 281, profiles 260 and 360 may not be reliably distinguished using the first detected speed and a threshold set between the speeds of those profiles at the value of test driving signal 281. As such, in some examples, threshold speed 410 may be set between tolerances 263 and 361, such that a second detected speed (i.e., a speed detected while target fan 150 is driven with test driving signal 481) that is above threshold speed 410 may be reliably correlated with fan speed profile 360 and thus a fan of a third model type. Accordingly, profiles 260 and 360 may be distinguished by comparing a second detected speed to speed threshold 410.

As such, in some examples, instructions 138 may determine that target fan 150 is a fan of a first model type if the first detected speed is below speed threshold 210. Additionally, instructions 138 may determine that target fan 150 is a fan of a second model type if the first detected speed is above speed threshold 210 and the second detected speed is below speed threshold 410. Moreover, instructions 138 may determine that target fan 150 is a fan of a third model type if the first detected speed is above speed threshold 210 and the second detected speed is above speed threshold 410. Although an implementation of the example of FIG. 4 is described above in the context of computing system 370 of FIG. 3, the example of FIG. 4 could also be practiced in other contexts (e.g., the context of computing system 170 or 670). Additionally, the example of FIG. 4 may be extended for distinguishing fans of more than three different model types using, for example, unique fan speed profiles for each of the different model types and comparing a plurality of detected speeds to a plurality of suitable threshold speeds, respectively.

In the example of FIG. 4, there may be no driving signal value at which each of profiles 160, 260, and 360 may be reliably distinguished from one another. However, the respective slopes (or average slopes) of profiles 160, 260, and 360 may be smaller than in another example in which three or more fan speed profiles may be distinguished from one another at a single driving signal value. Providing a fan speed profile with a smaller slope may allow finer control of fan speed.

Figure 5:
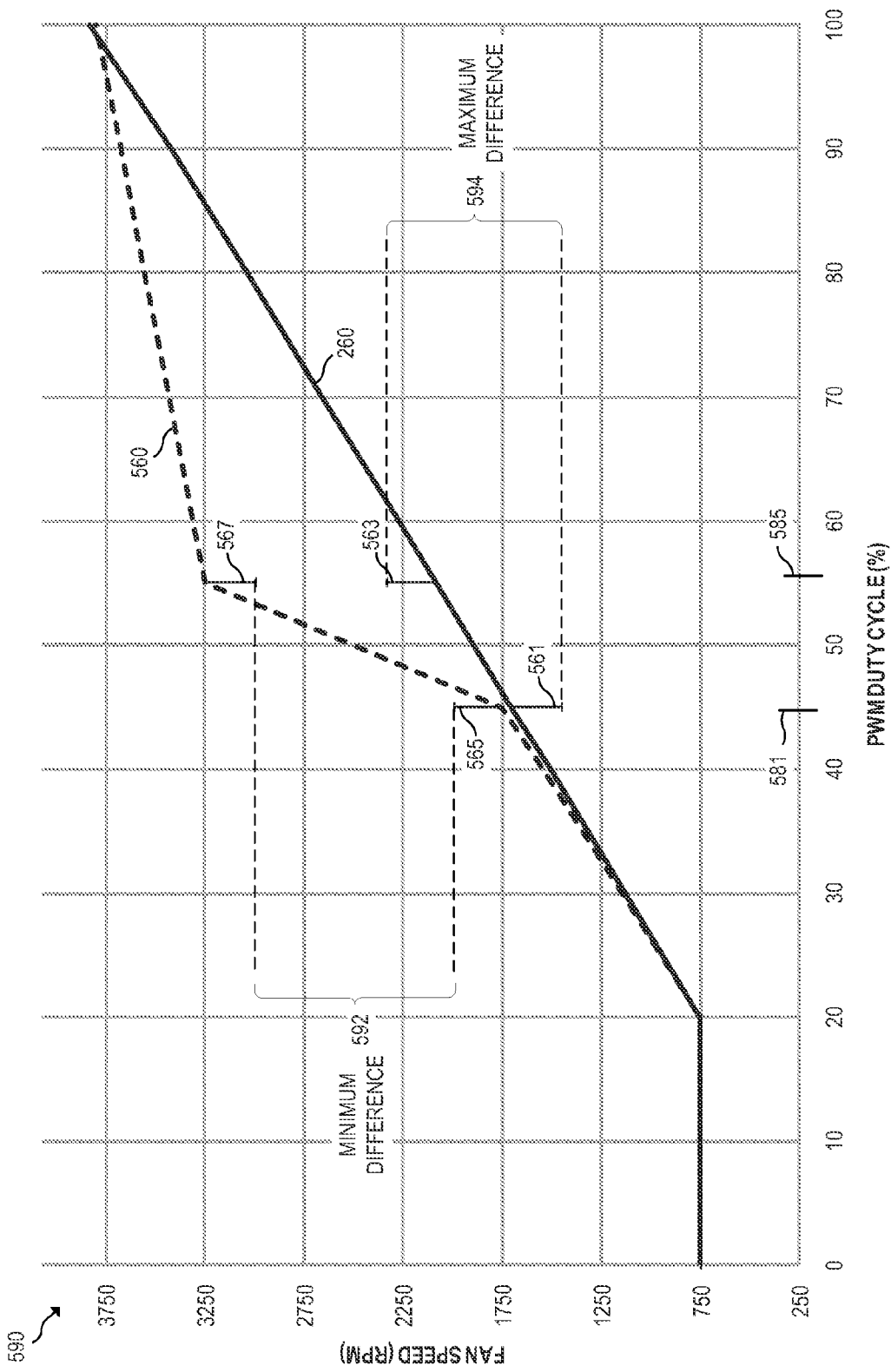
FIG. 5 is a graph of two example fan speed profiles that may be distinguished based on the respective slopes of the profiles, according to one example herein.

FIG. 5 is a graph of two example fan speed profiles 260 and 560 that may be distinguished based on the respective slopes of the profiles, according to one example herein. In the example of FIG. 5, graph 590 illustrates example fan speed profiles 260 and 560 of fans of different model types, respectively. In such examples, fans of different model types may be designed to have different slopes around at least one range of driving signal values such that fans of the different model types may be distinguished based on their respective slopes in that range.

In the example of FIG. 5, fan speed profiles 260 and 560 are each illustrated as a plurality of fan speeds (RPM) at each of a plurality of driving signal values (PWM duty cycle). In the example of FIG. 5, fans of a first model type have a fan speed profile 560 and fans of a second model type different than the first model type have a fan speed profile 260. As shown in graph 590, fan speed profile 560 has a much greater slope than fan speed profile 260 in the driving signal range of 45-55% PWM duty cycle. In other examples, profiles 560 and 260 may have significantly different slopes in another driving signal range.

Additionally, a fan driven with a driving signal may, for example, achieve a speed that is within a certain tolerance range of the speed defined by the fan speed profile, as described above in relation to FIG. 2. For example, fans of the first and second model types may each have a tolerance of about +/−250 RPM at various PWM duty cycles. In other examples, the fans may have different and/or varying tolerance amounts. In the example of FIG. 5, a partial tolerance range is shown for each of profiles 260 and 560 at each of 45% and 55% PWM duty cycles. For example, at a 45% PWM duty cycle, profile 260 may have a lower tolerance 561 of −250 RPM, and at a 55% PWM duty cycle, profile 260 may have an upper tolerance 563 of +250 RPM. Additionally, at a 45% PWM duty cycle, profile 560 may have an upper tolerance 565 of +250 RPM, and at a 55% PWM duty cycle, profile 560 may have a lower tolerance 567 of −250 RPM.

In some examples, computing device 300 of FIG. 3 may determine whether target fan 150 is a fan of a first model type having a fan speed profile 560 or a fan of a second model type having a fan speed profile 260, in accordance with the example of FIG. 5. In such examples, after instructions 131 interrupt the operation of fan controller module 340, instructions 132 may cause fan controller module 340 to drive target fan 150 with a test driving signal 581, and instructions 134 may detect a first speed of target fan 150 while driven with test driving signal 581. After detecting the first speed, instructions 132 may cause fan controller module 340 to drive target fan 150 with a test driving signal 585, and instructions 134 may detect a second speed of target fan 150 while driven with test driving signal 585.

In some examples, the respective values of test driving signals 581 and 585 may be set at or near the boundaries of a driving signal range within which the slopes of profiles 260 and 560 are known or designed to differ significantly. For example, as illustrated in FIG. 5, test driving signal 581 may have a PWM duty cycle of about 45%, and test driving signal 585 may have a PWM duty cycle of about 55%. In other examples, test driving signals 581 and 585 may have other values.

After detecting the first and second speeds, instructions 137 may determine a difference between the first and second detected speeds, which may be referred to herein as a "detected difference." For example, instruction 137 may determine the detected difference by finding the absolute value of the result of subtracting the first detected speed from the second detected speed. After determining the detected difference, instructions 138 may determine whether target fan 150 is a fan of a first or second model type from the detected difference by comparing the detected difference to a difference threshold. In some examples, the difference threshold may be set between a maximum difference 594 for profile 260 and a minimum difference 592 for profile 590 (which is greater than maximum difference 594). In such examples, instructions 138 may determine that target fan 150 is a fan of the first model type if the detected difference is less than the threshold difference, and may determine that target fan 150 is a fan of the second model type if the detected difference is greater than the threshold difference.

In the example of FIG. 5, maximum difference 594 may be approximately the greatest difference between first and second detected speeds that may be observed for a fan of the second model type (having profile 260) when driven with test driving signals 581 and 585, respectively. For example, a detected difference approximately equal to maximum difference 594 may be found when a fan of the second model type achieves a lowest speed within lower tolerance 561 when driven with test driving signal 581 and achieves a highest speed within upper tolerance 563 when driven with test driving signal 585. In such examples, a detected difference approximately equal to maximum difference 594 may be indicative that the fan being tested is a fan of the second model type.

Additionally, in the example of FIG. 5, a minimum difference 592 may be approximately the least difference between first and second detected speeds that may be observed for a fan of the first model type (having profile 560) when driven with test driving signals 581 and 585, respectively. For example, a detected difference approximately equal to minimum difference 592 may be found when a fan of the first model type achieves a greatest speed within upper tolerance 565 when driven with test driving signal 581 and achieves a lowest speed within lower tolerance 567 when driven with test driving signal 585. In such examples, a detected difference approximately equal to minimum difference 592 may be indicative that the fan being tested is a fan of the first model type.

Accordingly, in some examples, the difference threshold may be set between minimum difference 592 and maximum difference 594 such that the difference threshold may be reliably used to distinguish between fans of the first and second model types. Although an implementation of the example of FIG. 5 is described above in the context of computing system 370 of FIG. 3, the example of FIG. 5 could also be practiced in other contexts (e.g., the context of computing system 170 or 670). Additionally, the example of FIG. 5 may be extended for distinguishing fans of more than two different model types.

Figure 6:
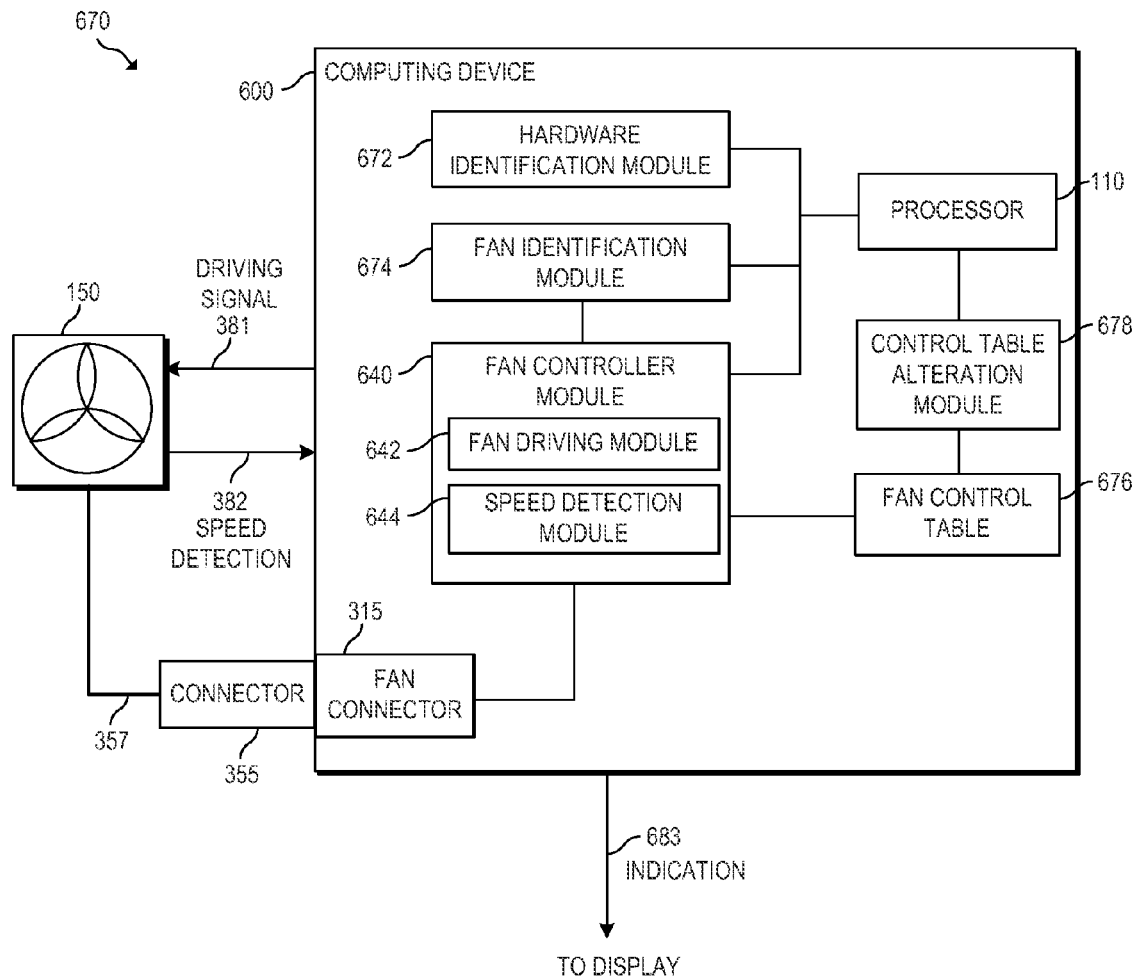
FIG. 6 is a block diagram of at least a portion of an example computing system for determining a model type of a target fan connected to a computing device including a fan identification module.

FIG. 6 is a block diagram of at least a portion of an example computing system 670 for determining a model type of a target fan 150 connected to a computing device 600 including a fan identification module 672. Computing system 670 includes a computing device 600 and a target fan 150 having a fan speed profile. In the example of FIG. 6, target fan 150 is connected to computing device 600 by a connection 357 (e.g., a cable, etc.) having a multi-pin connector 355. In some examples, connector 355 may be a 4-pin connector. In some examples, all communications between target fan 150 and computing device 600 may be provided through connection 357 and connectors 355 and 315. Computing device 600 includes a processor 110, a fan connector 315 (e.g., a 4-pin connector), a hardware identification module 672, a fan identification module 674, and a fan controller module 640. Fan controller module 640 may include, for example, a fan driving module 642 and a speed detection module 644. Additionally, computing device 600 includes a fan control table 676 and a control table alteration module 678.

In the example of FIG. 6, each of modules 672, 674, 640, 642, 644, and 678 may comprise logic for implementing the functionality described below. For example, computing device 600 may comprise at least one hardware device including electronic circuitry for implementing the functionality of the modules. Alternatively, the functionality of the modules may be implemented as a series of instructions encoded on a machine-readable storage medium of computing device 600 and executable by processor 110. In some examples, the executable instructions may be part of the BIOS of computing device 600 and executed prior to execution of an operating system. Alternatively, the executable instructions may be a portion of a diagnostic application that may be executed during execution of an operating system of computing device 600. In some examples, some functionality of the modules may be implemented as electronic circuitry while the other functionality is implemented as executable instructions.

Fan driving module 642 may, for example, drive target fan 150 with driving signals 381, and speed detection module 644 may detect a speed of target fan 150 based on speed detection signals 382 received from target fan 150. In some examples, communications 381 and 382 may be provided between target fan 150 and computing device 600 through connection 357 and connectors 355 and 315. In some examples, during operation of computing device 600, fan controller module 640 may control target fan 150 to cool at least one component of computing device 600 independent of processor 110. During operation of computing device 600, fan controller module 640 may continually detect a temperature of computing device 600 (e.g., an ambient temperature, a temperature of a hardware component of computing device 600, etc.) via at least one temperature sensor of computing device 600. In response to the temperatures detected, fan driving module 642 may drive target fan 150 via driving signals 381 to appropriately cool at least one component of computing device 600 (e.g., processor 110, a graphics card, etc.). Additionally, speed detection module 644 may receive speed detection signals 382 and detect a current speed of target fan 150 based on the received speed detection signals 382 while fan driving module 642 is driving target fan 150 with a driving signal 381. In some examples, in response to the speed detected by speed detection module 644, fan driving module 642 may change the value of driving signal 382 to achieve a desired speed of target fan 150. Speed detection module 644 may detect a speed of target fan 150 as described above in relation to FIG. 3.

In the example of FIG. 6, fan controller module 640 may control the operation of target fan 150 in accordance with the contents of fan control table 676. In such examples, fan control table 676 may include a plurality of temperatures (or temperature ranges) and fan speeds (or fan speed ranges) corresponding to each of the temperatures (or temperature ranges), respectively. For example, the speeds included in table 676 may indicate a speed (or speed range) at which target fan 150 may be operated when a temperature (or temperature range) corresponding to that speed is detected. As such, fan controller module 640 may use fan control table 676 to determine a speed at which to operate target fan 150 in response to a detected temperature. In some examples, fan control table 676 may be a machine-readable storage medium.

Additionally, fans of different model types may, for example, have different cooling efficiencies. As such, when a particular temperature is detected, a fan of a more efficient model type may be operated at a lower speed than a fan of a less efficient model type. Accordingly, in some examples, the contents of fan control table 676 may be set differently for operating fans of different model types. In such examples, control table alteration module 678 may contain fan control information for a plurality of fan model types. In such examples, control table alteration module 678 may alter the contents of fan control table 676 for the operation of a fan of a particular model type. Moreover, in some examples, a fan of a particular model type may be operated differently (e.g., at different speeds for certain detected temperature ranges) for cooling different hardware components having different characteristics (e.g., different heating characteristics). In such examples, for at least one fan model type, control table alteration module 678 may contain multiple sets of fan control information such that fans of a particular model type may be operated differently when cooling different hardware components.

In the example of FIG. 6, fan identification module 674 may determine, based at least in part on a speed detected by speed detection module 644, an identity of target fan 150 among a plurality of target fans each of a different model type. In some examples, fan identification module 674 may compare a speed detected by module 644 to at least one threshold speed to determine the identity of target fan 150.

For example, fan identification module 674 may identify target fan 150 by determining, from at least one speed detected by module 644 while target fan is driven by module 642 with a test driving signal 381, whether target fan is a fan of a first or second model type, in accordance with the example described above in relation to FIG. 2. In other examples, fan identification module 674 may identify target fan 150 by determining whether target fan 150 is a fan of a first, second, or third model type, in accordance with the example of FIG. 4 described above, using modules 642 and 644. In other examples, fan identification module 674 may identify target fan 150 by determining the model type of target fan 150 among more than three different model types. In some examples, after fan identification module 674 determines the model type of target fan 150, fan identification module 674 may instruct control table alteration module 678 to alter fan control table 676 for operating a fan of the model type of target fan 150.

Additionally, in some examples, hardware identification module 672 may determine the identity of a hardware component of computing device 600 of a particular class of hardware components. The class of hardware components may be, for example, processors, graphics cards, or any other class of hardware components that may benefit from being cooled by a fan or a heat sink including a fan. Different components within a class may, for example, have different characteristics (e.g., heating characteristics). As used herein, "heating characteristics" of a hardware component include temperatures that the component may reach under various operating conditions (e.g., amount of utilization, elapsed utilization time, etc.) when not cooled.

In some examples, after determining the identity of the hardware component, hardware identification module 672 may configure computing device 600 to operate target fan 150 as a fan of a first model type beneficial for cooling the identified hardware component and in accordance with heating characteristics of the identified hardware component before determining the model type of target fan 150. Hardware identification module 672 may configure computing device 600 by, for example, instructing control table alteration module 678 to alter fan control table 676 for operating target fan 150 as a fan of the first model type and in accordance with the heating characteristics of the identified hardware component. As noted above, control table alteration module 678 may include multiple sets of fan control information for a particular fan model type such that fan control table 676 may be configured to operate target fan 150 both as a fan of a particular model type and in accordance with the heating characteristics of the identified hardware component. In other examples, hardware identification module 672 may configure computing device 600 to operate target fan 150 as a fan of a first model type beneficial for cooling the identified hardware component and not necessarily in accordance with heating characteristics of the identified hardware component.

In some examples, hardware identification module 672 may determine whether processor 110 (e.g., a processor connected to a motherboard of computing device 600) is a first processor having first heating characteristics or a second processor having second heating characteristics different than the first heating characteristics. In such examples, hardware identification module 672 may determine whether processor 110 is the first or second processor by reading information in a register (or other storage area) of processor 110, or by any other suitable manner of identifying processor 110. In response to determining that processor 110 is a first processor, for example, hardware identification module 672 may configure computing device 600 to operate target fan 150 as a fan of a first model type beneficial for cooling the first processor. In some examples, the first processor may generate significantly more heat than the second processor (e.g., may be significantly more difficult to cool than the second processor), and fans of the first model type may be significantly more efficient than fans of the second model type. In such examples, hardware identification module 672 may configure computing device 600 by instructing control table alteration module 678 to alter fan control table 676 for the operation of a fan of the first model type. In some examples, hardware identification module 672 may also instruct control table alteration module 678 to alter fan control table 676 for the operation of a fan of the first model type in accordance with the heating characteristics of the first processor.

Additionally, in some examples, hardware identification module 672 may configure computing device 600, as described above, before determining the model type of target fan 150 with fan identification module 674. In such examples, fan identification module 674 may subsequently determine a model type of target fan 150. If the fan identification module 674 determines, for example, that target fan 150 is a fan of the model type hardware identification module 672 has configured computing device 600 to operate, then that configuration of computing device 600 is not altered (e.g., fan control table 676 is not altered) after the determination.

However, if fan identification module 674 determines, for example, that the model type of target fan 150 is different than the model type that hardware identification module 672 has configured computing device 600 to operate, then computing device 600 may output, to a display of (or connected to) computing device 600, an indication 683 that a fan of an incorrect model type for the detected processor 110 is connected to computing device 600.

Additionally or alternatively, if fan identification module 674 determines, for example, that the model type of target fan 150 is different than the model type that hardware identification module 672 has configured computing device 600 to operate, then fan identification module 674 may configure computing device 600 to operate a fan of the detected model type of target fan 150. In such examples, fan identification module 674 may instruct control table alteration module 678 to alter fan control table 676 for the operation of a fan of the detected model type of target fan 150. Additionally, in such examples, fan identification module 674 may also instruct control table alteration module 678 to after fan control table 676 to operate target fan 150 in accordance with the heating characteristics of the hardware component identified by module 672 (e.g., the first processor).

In other examples, computing device 600 may be configured to operate target fan 150 after hardware identification module 672 has identified the hardware component and fan identification module 674 has determined the model type of target fan 150. For example, after hardware identification module 672 determines that processor 110 is a first processor having first heating characteristics and fan identification module 674 determines the target fan 150 is a fan of a first model type, control table alteration module 678 may after fan control table 676 to operate target fan 150 as a fan of the first model type. In such examples, control table alteration module 678 may also alter fan control table 676 to operate target fan 150 in accordance with the first heating characteristics.

Figure 7:
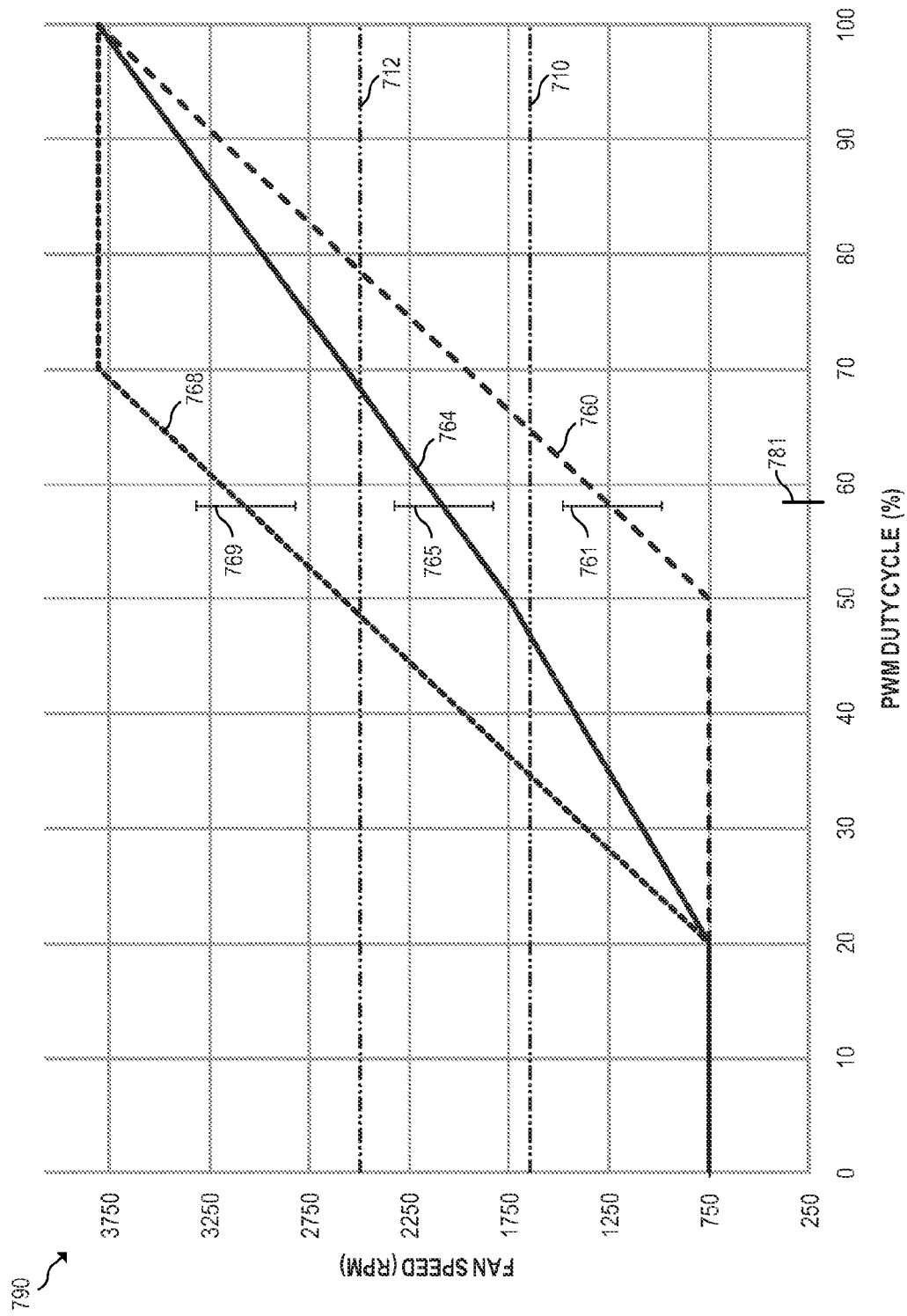
FIG. 7 is a graph of three example fan speed profiles and two threshold speeds that may be used to distinguish the profiles, according to one example herein.

FIG. 7 is a graph of three example fan speed profiles 760, 764, and 768, and two example threshold speeds 710 and 712 that may be used to distinguish among the profiles, according to one example herein. In the example of FIG. 7, graph 790 illustrates example fan speed profiles 760, 764, and 768 of fans of different model types, respectively. In some examples, fans of first, second, and third model types may be designed to have respective fan speed profiles 760, 764, and 768 that, within a first range of driving signal values, are divergent from one another by wide enough margins to distinguish the fans of the first, second, and third model types based on at least one detected speed when a fan being tested is driven within a driving signal in the first range.

In the example of FIG. 7, fan speed profiles 760, 764, and 768 are each illustrated as a plurality of fan speeds (RPM) at each of a plurality of driving signal values (PWM duty cycle). In some examples, fan speed profiles 760, 764, and 768 have respective tolerances 761, 765, and 769 of +/−250 RPM at a driving signal value of about 58%. Graph 790 also illustrates an example threshold speed 710 between tolerances 761 and 765 of fan speed profiles 760 and 764, respectively. Moreover, graph 790 illustrates an example threshold speed 712 between tolerances 765 and 769 of fan speed profiles 764 and 768, respectively.

In some examples, computing device 600 of FIG. 6 may determine whether target fan 150 is a fan of a first model type having a fan speed profile 760, a second model type having a fan speed profile 764, or a third model type having a fan speed profile 768, in accordance with the example of FIG. 7. In such examples, fan driving module 642 drive target fan 150 with test driving signal 781 within a first range of driving signal values at which fan speed profiles 760, 764, and 768 are sufficiently divergent from one another.

As illustrated in FIG. 7, for example, test driving signal 781 may have a PWM duty cycle of about 58%. In other examples, test driving signal 781 may have another value within the first range (e.g., another PWM duty cycle between about 50 and 70%). Speed detection module 644 may then detect a first speed of target fan 150 while driven with test driving signal 781. Although a test driving signal of around 58% is used in the example of FIG. 7, in other examples, fan speed profiles may be designed such that the profiles may be distinguished using a test driving signal of a different value. For example, profiles 760, 764, and 768 may be designed such that the profiles may be distinguished from one another based on the respective minimum or maximum speeds of the profiles.

After detecting the first speed, fan identification module 674 may determine, based on the detected first speed, an identity of target fan 150 among a plurality of fans each of a different model type. For example, in accordance with the example of FIG. 7, fan identification module 674 may determine, based on the detected first speed, an identity of target fan 150 among a fan of a first model type, a fan of a second model type, and a fan of a third model type. In some examples, fan identification module 674 may compare the first detected speed to threshold speed 710. In the example of FIG. 7, threshold speed 710 is set between tolerances 761 and 765, such that a first detected speed that is below threshold speed 710 may be reliably correlated with fan speed profile 760 and thus with a fan of the first model type. Additionally, a first detected speed above threshold speed 710 may correspond to either profile 764 or 768. As such, in some examples, threshold speed 712 may be set between tolerances 765 and 769 such that a first detected speed that is above threshold speed 712 may be reliably correlated with fan speed profile 768 and thus with a fan of the third model type. Accordingly, profiles 760, 764, and 768 may be distinguished by comparing the first detected speed to speed thresholds 710 and 712.

As such, in some examples, fan identification module 674 may determine that target fan 150 is a fan of the first model type if the first detected speed is below speed threshold 710. Additionally, fan identification module 674 may determine that target fan 150 is a fan of the second model type if the first detected speed is above speed threshold 710 and below speed threshold 712. Moreover, fan identification module 674 may determine that target fan 150 is a fan of the third model type if the first detected speed is above speed thresholds 710 and 712. Although an implementation of the example of FIG. 7 is described above in the context of computing system 670 of FIG. 6, the example of FIG. 7 could also be practiced in other contexts (e.g., the context of computing system 170 or 370). Additionally, the example of FIG. 7 may be extended for distinguishing fans of more than three different model types using, for example, unique fan speed profiles for each of the different model types and comparing a detected speed to a suitable plurality of threshold speeds, respectively.

Figure 8:
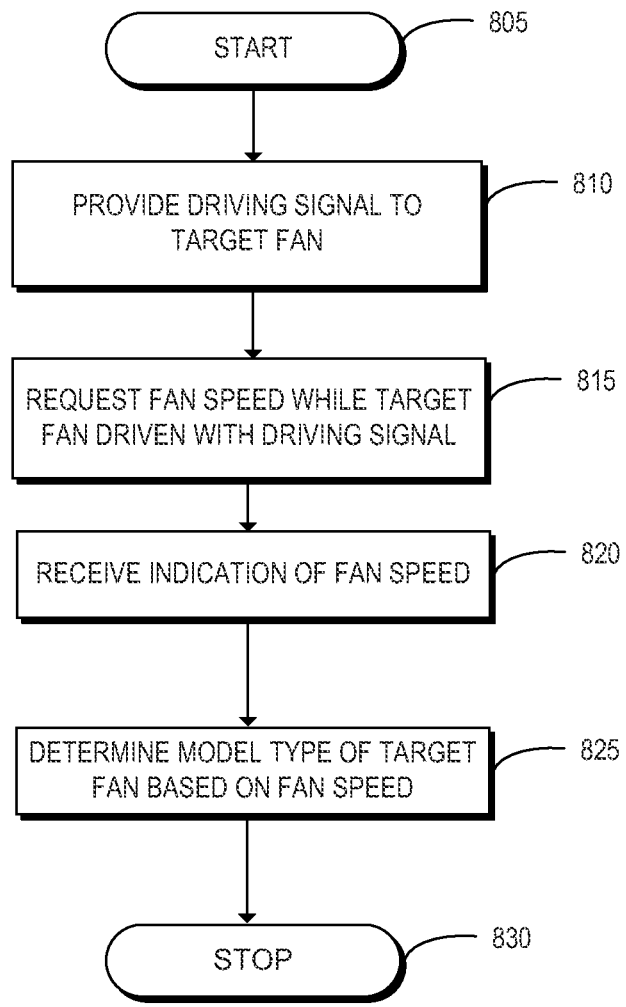
FIG. 8 is a flowchart of an example method for determining a model type of a target fan.

FIG. 8 is a flowchart of an example method 800 for determining a model type of a target fan. Although execution of method 800 is described below with reference to computing system 170 of FIG. 1, other suitable components for execution of method 800 can be utilized (e.g., computing system 370 or 670). Additionally, method 800 may be implemented in the form of executable instructions stored on a machine-readable storage medium, such as storage medium 120 of FIG. 1, in the form of electronic circuitry, or a combination thereof.

Method 800 may start at 805 and proceed to 810, where computing device 100 may provide a test driving signal to target fan 150. While driving target fan 150 with the test driving signal, method may proceed to 815, where a detected speed of target fan 150 may be requested while target fan 150 is driven with the test driving signal. Method 800 may then proceed to 820, where an indication of the detected speed of target fan 150 while driven with the test driving signal may be received. After the indication of the detected speed is received, method 800 may proceed to 825, where computing device 100 may determine a model type of target fan 150 based at least in part on the detected speed. Method 800 may then proceed to 830, where method 800 may stop.

Figure 9:
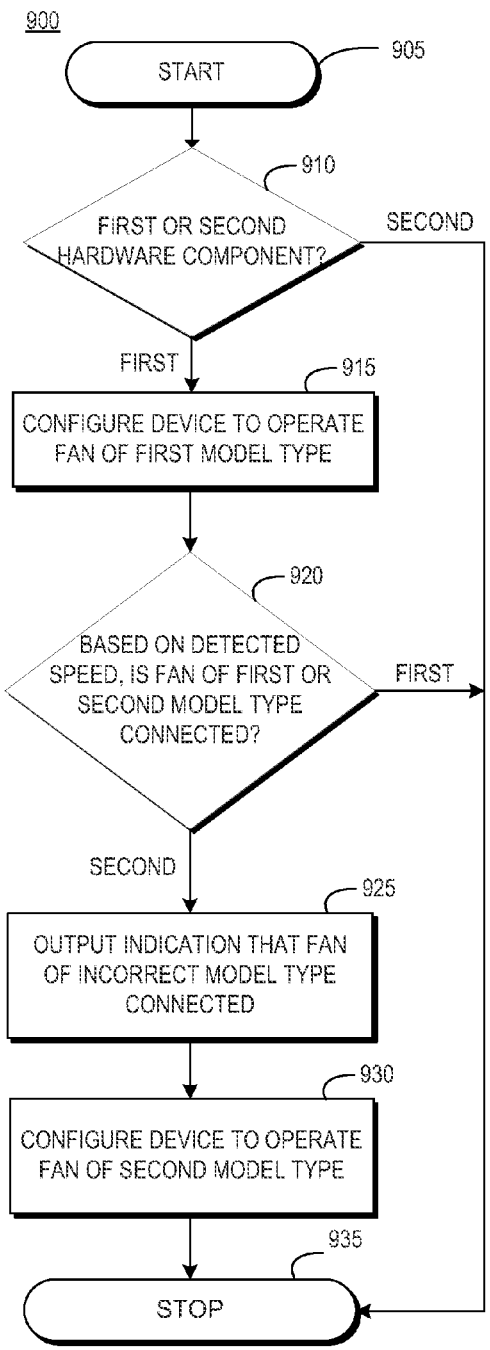
FIG. 9 is a flowchart of an example method for configuring a computing device to operate a target fan connected thereto.

FIG. 9 is a flowchart of an example method 900 for configuring a computing device 100 to operate a target fan 150 connected thereto. Although execution of method 900 is described below with reference to computing system 170 of FIG. 1, other suitable components for execution of method 900 can be utilized (e.g., computing system 370 or 670). Additionally, method 900 may be implemented in the form of executable instructions stored on a machine-readable storage medium, such as storage medium 120 of FIG. 1, in the form of electronic circuitry, or a combination thereof.

Method 900 may start at 905 and proceed to 910, where it may be determined whether a hardware component of computing device 100 is a first or second hardware component. In some examples, the first and second hardware components may be members of the same class of hardware components (e.g., processors, graphics cards, etc.). The first and second hardware components may be, for example, first and second processors having first and second heating characteristics, respectively. If it is determined that the hardware component is the second hardware component, then method 900 may proceed to 935, where method 900 may stop. In such examples, fans of the first and second model type may both have sufficient cooling efficiency to cool the second processor having the second heating characteristics. As such, computing device 100 may operate target fan 150 for the second processor without further configuration.

Otherwise, if it is determined that the hardware component is the first hardware component, then method 900 may proceed to 915. At 915, computing device 100 may be configured to operate target fan 150 as a fan of a first model type. In some examples, computing device 100 may also be configured to operate target fan 150 in accordance with the first heating characteristics of the first hardware component. Method 900 may then proceed to 920, where computing device 100 may determine whether target fan 150 connected to computing device 100 is a fan of a first or a second model type based on a detected first speed of target fan 150 while target fan 150 is driven with a test driving signal. In some examples, this determination may be made by comparing the detected first speed to a threshold, as described above in relation to the example of FIG. 2.

If it is determined at 920 that target fan 150 is a fan of a first model type, method 900 may proceed to 935, where method 900 may stop. In such examples, computing device 100 has already been configured to operate a fan of the first model type, and the target fan may be determined to be an appropriate fan for cooling the first hardware component. Otherwise, if it is determined at 920 that target fan 150 is a fan of a second model type, method 900 may proceed to 925, where an indication may be output indicating that a fan of an incorrect model type is connected to computing device 100. In some examples, the indication may be output via a display or other output device connected to computing device 100. Method 900 may then proceed to 930, where computing device 100 may be configured to operate target fan 150 as a fan of a second model type different than the first model type. In some examples, at 930, computing device 100 may also be configured to operate target fan 150 in accordance with the first heating characteristics of the first processor. Method 900 may then proceed to 935, where method 900 may stop. In other examples, method 900 may omit 930 and proceed from 925 to 935, where method 900 may stop.

Figure 10:
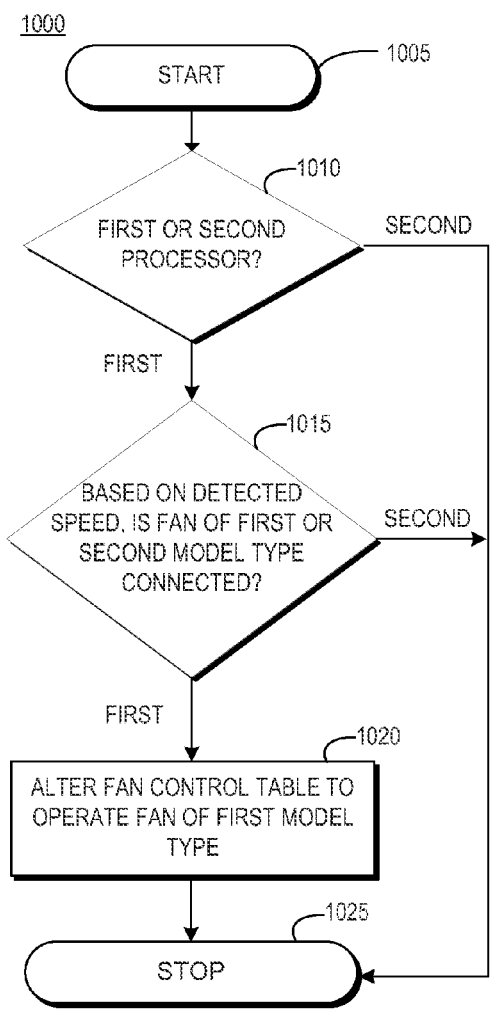
FIG. 10 is a flowchart of an example method for configuring a computing device to operate a target fan connected thereto after determining a model type of the fan.

FIG. 10 is a flowchart of an example method 1000 for configuring a computing device 100 to operate a target fan 150 connected thereto after determining a model type of target fan 150. Although execution of method 1000 is described below with reference to computing system 170 of FIG. 1, other suitable components for execution of method 1000 can be utilized (e.g., computing system 370 or 670). Additionally, method 1000 may be implemented in the form of executable instructions stored on a machine-readable storage medium, such as storage medium 120 of FIG. 1, in the form of electronic circuitry, or a combination thereof.

Method 1000 may begin at 1005, where method 1000 may proceed to 1010, where it may be determined whether a processor 110 of computing device 100 is a first or second processor. The first and second processors may have, for example, different heating characteristics (e.g., first and second heating characteristics, respectively). In other examples, method 1000 may determine at 1010 whether a hardware component other than a processor is a first or a second hardware component of a particular class of hardware components (e.g., graphics cards, etc.). If it is determined that the processor is the second processor, then method 1000 may proceed to 1025, where method 1000 may stop. In such examples, fans of the first and second model type may both have sufficient cooling efficiency to cool the second processor having the second heating characteristics. As such, computing device 100 may operate target fan 150 for the second processor without further configuration.

Otherwise, if it is determined that the processor is the first processor, then method 1000 may proceed to 1015. At 1015, it may be determined whether target fan 150 connected to computing device 100 is a fan of a first or a second model type based on a detected first speed of target fan 150 while target fan 150 is driven with a test driving signal. In some examples, this determination may be made by comparing the detected first speed to a threshold, as described above in relation to the example of FIG. 2. If it is determined that target fan 150 is a fan of a second model type, then method 1000 may proceed to 1025, where method 1000 may stop. In such examples, computing device 100 may already be configured to operate a fan of the second model type. As such, computing device 100 may operate target fan 150 without further configuration.

Otherwise, if it is determined at 1015 that target fan 150 is a fan of a first model type, then method 1000 may proceed to 1020, where a fan control table of computing device 100 may be altered to cause computing device 100 to operate target fan 150 as a fan of the first model type. In such examples, the fan control table may also be altered to cause computing device 100 to operate target fan 150 in accordance with the first heating characteristics of the first processor. Method 1000 may then proceed to 1025, where method 1000 may stop.

What is claimed is:

1. A non-transitory machine-readable storage medium encoded with instructions executable by a processor for identifying a target fan connected to a computing device, wherein the instructions, when executed, cause the processor to:

test, with the computing device, a fan speed profile of the target fan connected to the computing device, the fan speed profile defining a relationship between a plurality of fan driving signal values and respective fan speeds for the target fan;

compare a first threshold speed and a first speed of the target fan detected when the target fan is driven with a first driving signal in the test;

determine a model type of the target fan based on a comparison of a second threshold speed, different than the first threshold speed, and a second speed of the target fan detected when the target fan is driven with a second driving signal in the test.

2. The machine-readable storage medium of claim 1, wherein the instructions, when executed, cause the processor to:

drive the target fan with the first and second driving signals, each having a respective one of the plurality of fan driving signal values; and detect the first and second speeds of the target fan while the target fan is driven with the first and second driving signals, respectively.

3. The machine-readable storage medium of claim 2, wherein the instructions, when executed, cause the processor to:

determine that the target fan is of a first model type if the second detected speed is less than the second threshold speed; and determine that the target fan is of a second model type different than the first model type if the second detected speed is greater than the second threshold speed.

4. The machine-readable storage medium of claim 3, wherein the second threshold speed is between a first tolerance range for a speed of a fan of the first model type driven with the second driving signal and a second tolerance range for a speed of a fan of the second model type driven with the second driving signal.

5. The machine-readable storage medium of claim 1, the instructions, when executed, cause the processor to:

determine that the target fan is a fan of a first model type if the first detected speed is less than the first threshold speed;

determine that the target fan is a fan of a second model type, different than the first model type, if the first detected speed is above the first threshold speed and the second detected speed is below the second threshold speed; and determine that the target fan is a fan of a third model type, different than the first and second model types, if the second detected speed is greater than the second threshold speed.

6. The machine-readable storage medium of claim 1, wherein the instructions, when executed, cause the processor to:

determine whether the computing device includes a first or a second hardware component, wherein the first and second hardware components have first and second heating characteristics, respectively;

configure the computing device to operate the target fan as a fan of a first model type, and in accordance with the first heating characteristics, prior to determining the model type of the target fan, if it is determined that the first hardware component is included in the computing device; and configure the computing device to operate the target fan as a fan of the second model type and in accordance with the first heating characteristics, after a determination that the target fan is of the second model type.

7. The machine-readable storage medium of claim 1, wherein the instructions, when executed, cause the processor to:

determine whether the computing device includes a first or a second processor, the first and second processors having first and second heating characteristics, respectively; and alter a fan control table to configure the computing device to operate the target fan as a fan of a given model type, and in accordance with the first heating characteristics, if it is determined that the computing device includes the first processor and that the target fan is of the given model type.

8. A computing device for identifying a target fan connected to the computing device based on a fan speed profile of the target fan, the computing device comprising:

fan controller circuitry comprising:
fan driving circuitry to drive the target fan with a driving signal; and
speed detection circuitry to detect a speed of the target fan while the target fan is driven with the driving signal signals, respectively; and a non-transitory machine-readable storage medium comprising a fan identification module to:
compare the detected speed to a first threshold speed; and
compare the detected speed to a second threshold speed, different than the first threshold speed, to determine, based at least in part on the detected speed, an identity of the target fan among a plurality of fans each of a different model type.

9. The computing device of claim 8, wherein the second threshold speed is greater than the first threshold speed, and the fan identification module is further to:

determine that the target fan is a fan of a first model type if the detected speed is less than the first threshold speed; and determine that the target fan is a fan of a second model type, different than the first model type, if the detected speed is between the first and second threshold speeds.

10. The computing device of claim 9, wherein the fan identification module is further to determine that the target fan is a fan of a third model type, different than the first and second model types, if the detected speed is greater than the second threshold speed.

11. The computing device of claim 8, further comprising a hardware identification module, of the storage medium, to:

determine whether the computing device includes a first or a second hardware component, wherein the first and second hardware components have first and second heating characteristics, respectively;

configure the computing device to operate the target fan as a fan of a first model type, and in accordance with the first heating characteristics, prior to determining the model type of the target fan, if it is determined that the first hardware component is included in the computing device; and configure the computing device to operate the target fan as a fan of the second model type and in accordance with the first heating characteristics, after a determination that the target fan is of the second model type.

12. The computing device of claim 8, further comprising a hardware identification module, of the storage medium, to:

determine whether the computing device includes a first or a second processor, the first and second processors having first and second heating characteristics, respectively; and cause the alteration of a fan control table to configure the computing device to operate the target fan as a fan of a given model type, and in accordance with the first heating characteristics, in response to a determination that the computing device includes the first processor and that the target fan is of the given model type.

13. A method for identifying a target fan connected to a computing device based on a fan speed profile of the target fan, the method comprising:

providing, with the computing device, first and second driving signals to the target fan;

requesting first and second detected speeds of the target fan while the target fan is driven with the first and second driving signals, respectively;

receiving indications of the first and second detected speeds of the target fan; and comparing the first detected speed to a first threshold speed; and determining, with the computing device, a model type of the target fan based at least in part on a comparison of the second detected speed to the second threshold speed.

14. The method of claim 13, further comprising:

determining whether the computing device includes a first or a second hardware component, wherein the first and second hardware components have first and second heating characteristics, respectively;

configuring the computing device to operate the target fan as a fan of a first model type, and in accordance with the first heating characteristics, prior to determining the model type of the target fan, if it is determined that the first hardware component is included in the computing device; and outputting, after the configuring of the computing device, an indication that a fan of an incorrect model type for the first hardware component is connected to the computing device, if it is determined that the target fan is of a second model type different than the first model type.

15. The method of claim 14, further comprising:

configuring the computing device to operate the target fan as a fan of the second model type and in accordance with the first heating characteristics, after determining that the target fan is of the second model type.

16. The method of claim 13, further comprising:

determining whether the computing device includes a first or a second processor, the first and second processors having first and second heating characteristics, respectively; and altering a fan control table to configure the computing device to operate the target fan as a fan of a given model type, and in accordance with the first heating characteristics, if it is determined that the computing device includes the first processor and that the target fan is of the given model type.

* * * * *

UNITED STATES PATENT AND TRADEMARK OFFICE
CERTIFICATE OF CORRECTION

| | | |
|---|---|---|
| PATENT NO. | : 8,788,111 B2 | Page 1 of 1 |
| APPLICATION NO. | : 13/222250 | |
| DATED | : July 22, 2014 | |
| INVENTOR(S) | : Uhlmann et al. | |

It is certified that error appears in the above-identified patent and that said Letters Patent is hereby corrected as shown below:

In the Claims

Column 22, line 22, Claim 8, delete "signal signals," and insert -- signals, --, therefor.

Signed and Sealed this
Twenty-fifth Day of November, 2014

Michelle K. Lee
*Deputy Director of the United States Patent and Trademark Office*